(12) United States Patent
Ohshita et al.

(10) Patent No.: US 8,077,057 B2
(45) Date of Patent: Dec. 13, 2011

(54) INPUT DEVICE WITH PALM DETECTING UNIT

(75) Inventors: Kazuhito Ohshita, Niigata-ken (JP); Yasuji Hagiwara, Niigata-ken (JP); Tadamitsu Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 1038 days.

(21) Appl. No.: 11/934,412

(22) Filed: Nov. 2, 2007

(65) Prior Publication Data

US 2008/0266143 A1 Oct. 30, 2008

(30) Foreign Application Priority Data

Nov. 6, 2006 (JP) .................. 2006-300521

(51) Int. Cl.
*H03K 17/94* (2006.01)
*G06F 3/041* (2006.01)
*H03M 11/00* (2006.01)

(52) U.S. Cl. ........................................ 341/22; 345/173

(58) Field of Classification Search .... 178/18.01–20.04; 715/856–862; 345/156–178; 341/22–34; 400/472–496; 379/367–370; 708/131–146
See application file for complete search history.

(56) References Cited

U.S. PATENT DOCUMENTS

| 5,790,106 | A | 8/1998 | Hirano et al. |
| 6,054,979 | A * | 4/2000 | Sellers ........................ 345/173 |
| 6,560,612 | B1 * | 5/2003 | Yamada et al. ................... 1/1 |
| 6,757,002 | B1 | 6/2004 | Oross et al. |
| 2003/0043113 | A1 | 3/2003 | Itoh |
| 2005/0275637 | A1 * | 12/2005 | Hinckley et al. .............. 345/173 |
| 2007/0188474 | A1 * | 8/2007 | Zaborowski .................. 345/173 |
| 2008/0165138 | A1 | 7/2008 | Li |

OTHER PUBLICATIONS

Examination Report issued in corresponding Japanese Patent Application No. 2006-300521, mailed Dec. 2, 2008.

* cited by examiner

*Primary Examiner* — Timothy Edwards, Jr.
*Assistant Examiner* — Jerold Murphy
(74) *Attorney, Agent, or Firm* — Brinks Hofer Gilson & Lione

(57) ABSTRACT

A capacitive input pad is provided at a position near input keys constituting a keyboard input unit. A left palm detecting unit and a right palm detecting unit are provided both sides of this input pad. When the left palm detecting unit and the right palm detecting unit detect both palms, an input operation, corresponding to a space key input area, an L-key input portion, or an R-key input portion, is performed through an operation of the input pad. When the left palm detecting unit and the right palm detecting unit do not detect both palms, a coordinate input operation is performed using the input pad.

8 Claims, 10 Drawing Sheets

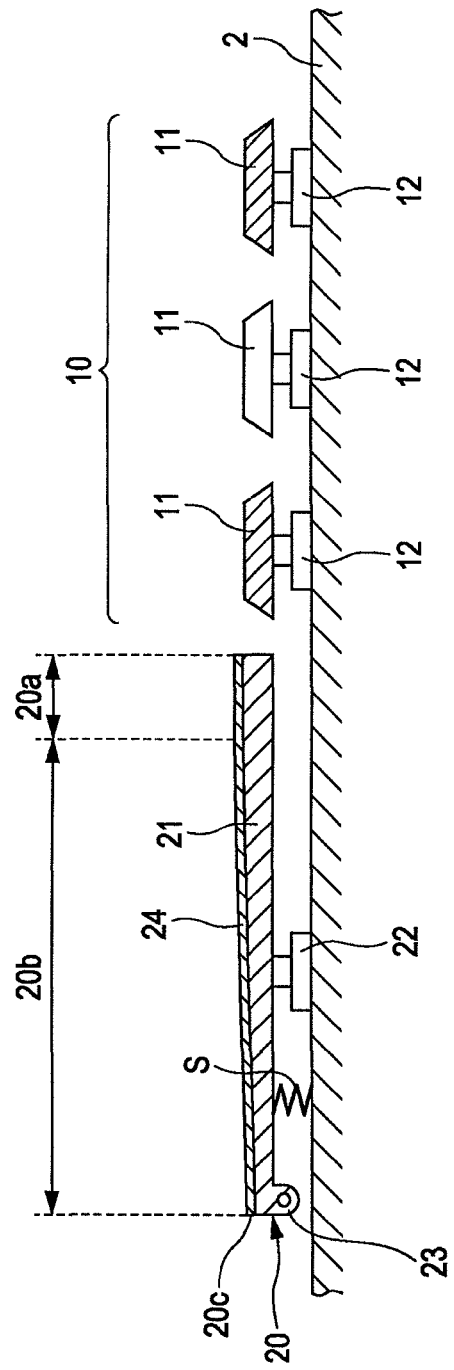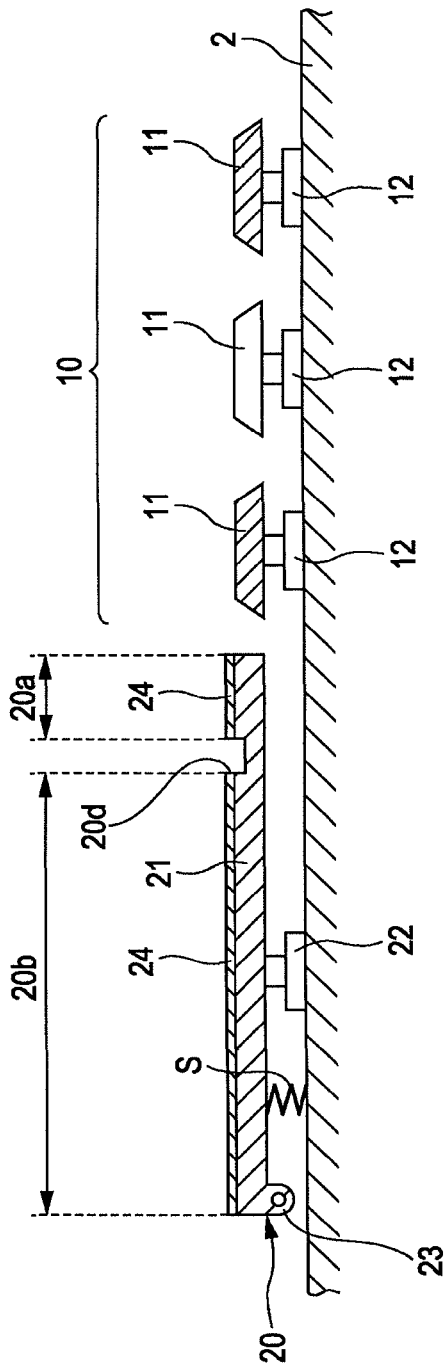

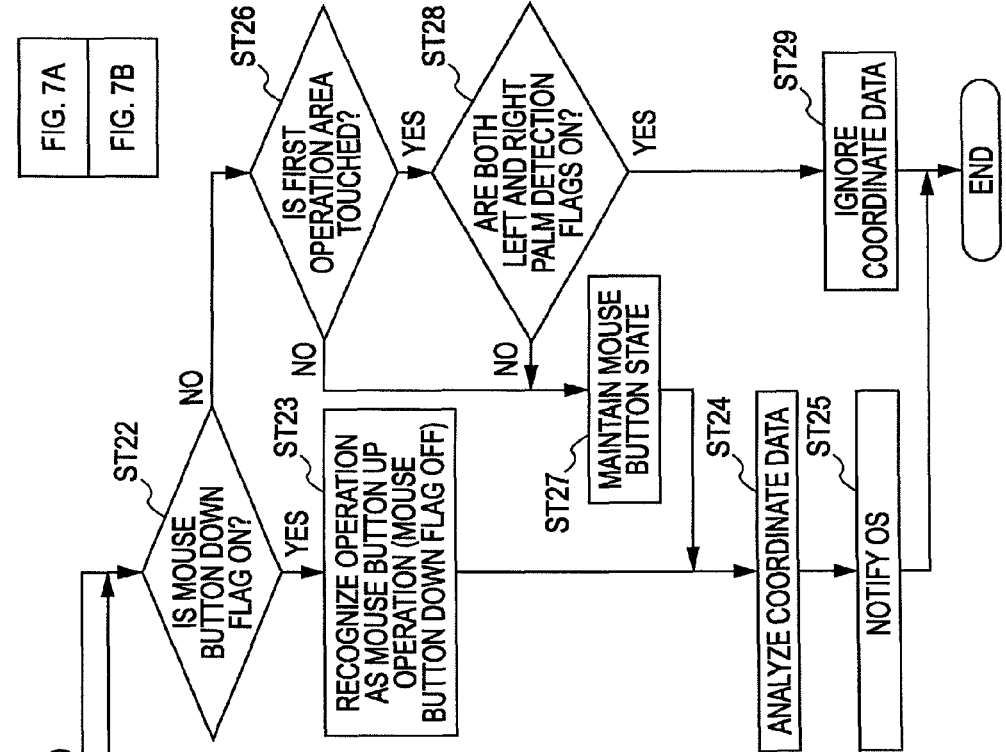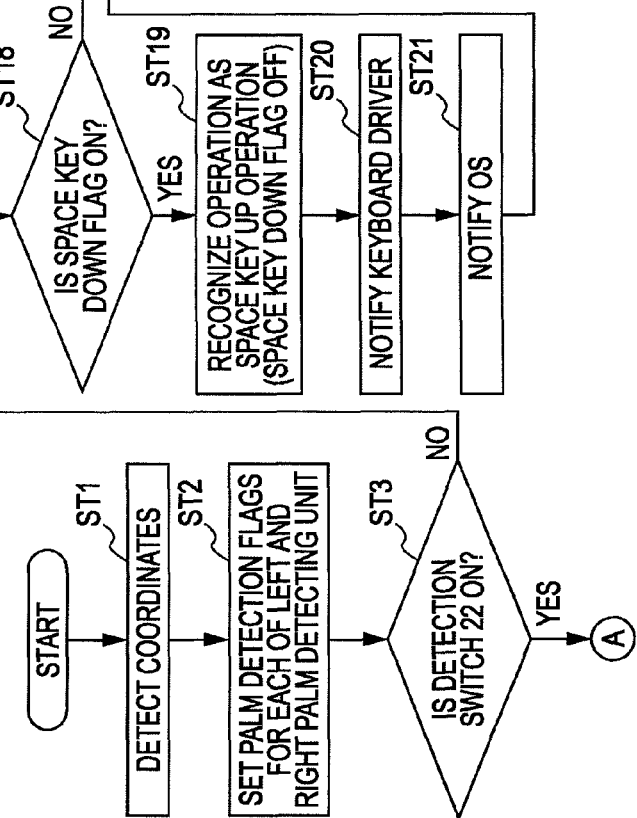
FIG. 7

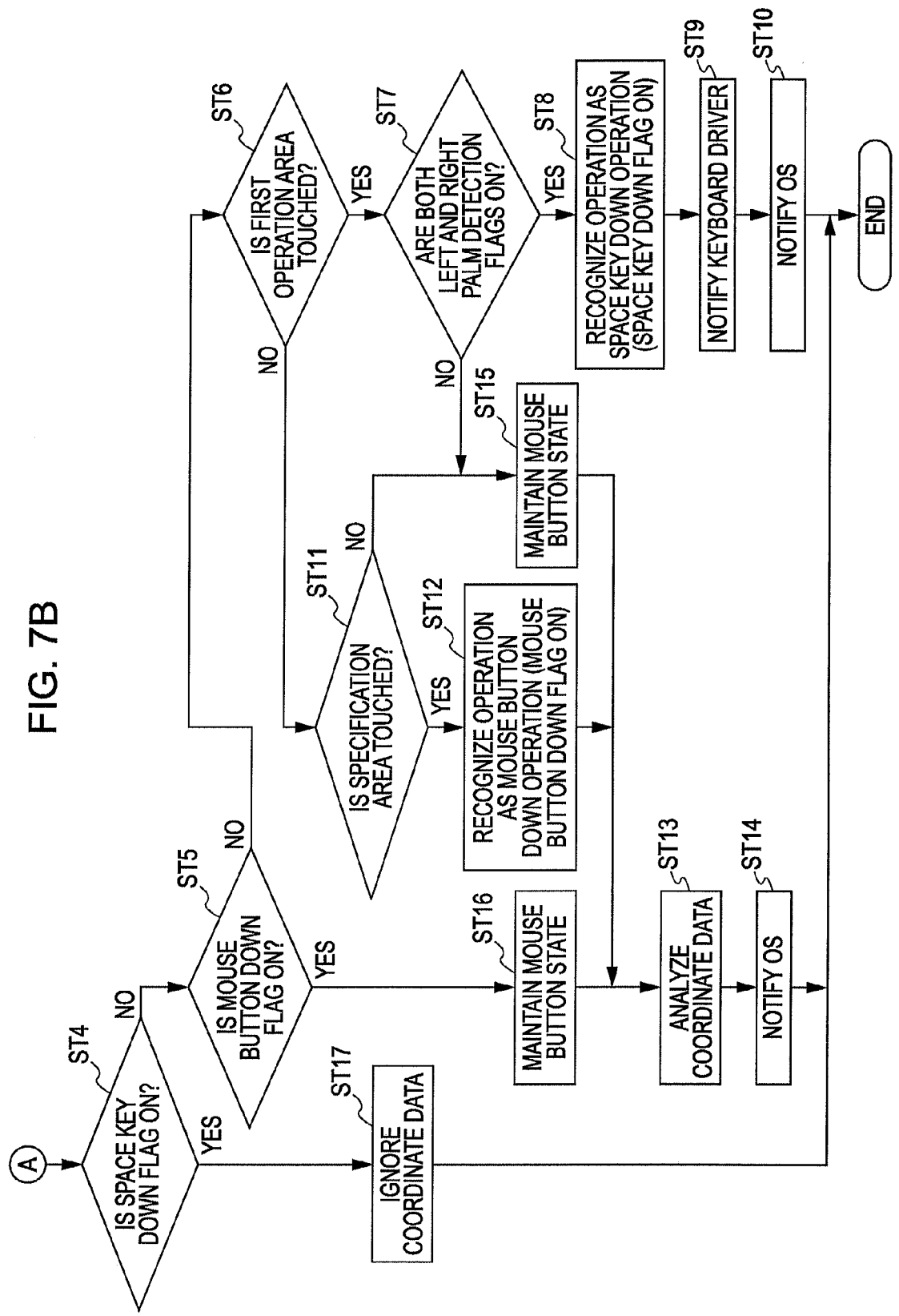

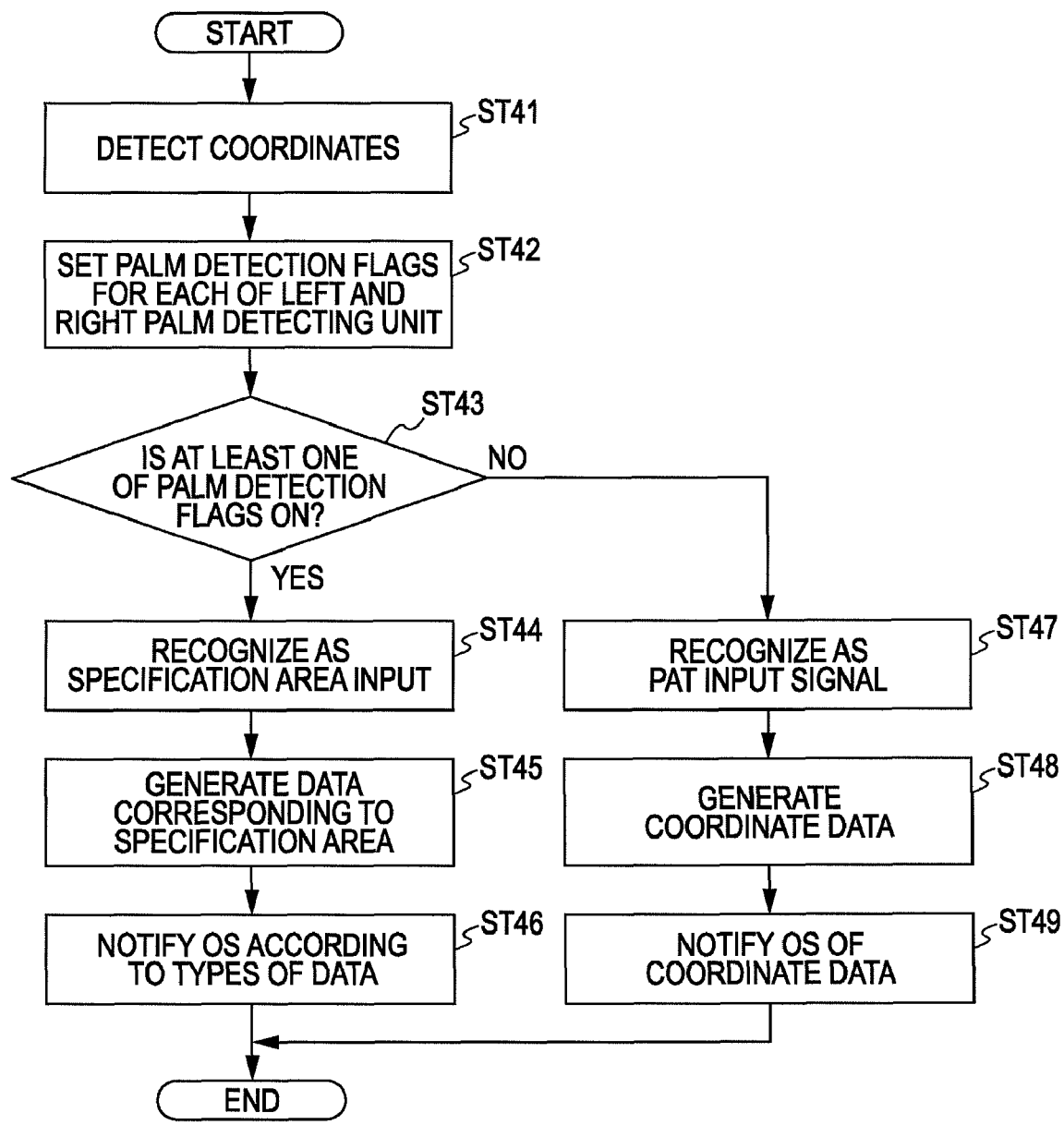

INPUT DEVICE WITH PALM DETECTING UNIT

CLAIM OF PRIORITY

This application claims benefit of the Japanese Patent Application No. 2006-300521 filed on Nov. 6, 2006, which is hereby incorporated by reference

BACKGROUND OF THE INVENTION

1. Field of the Invention

The present invention relates to an input device capable of generating various input signals using a capacitive input pad in combination with a switch.

2. Description of the Related Art

U.S. Pat. No. 5,790,106 and corresponding Japanese Unexamined Patent Application Publication No. 8-137607) disclose a capacitive input pad having a plurality of X-electrodes and Y-electrodes arranged in a matrix.

In this input pad, the plurality of X-electrodes are arranged on one surface of a glass substrate, whereas the plurality of Y-electrodes are arranged on the other surface of the glass substrate. The X-electrodes and the Y-electrodes are arranged in a matrix through the glass substrate, and a predetermined capacitance is formed between each X-electrode and the corresponding Y-electrode.

After a control unit brings a state into a state that each of the X-electrodes is connectable to an oscillation circuit and turns each of the Y-electrodes on, a predetermined potential is applied to each of the X-electrodes and each of the Y-electrodes. When a conductor, such as a finger, touches the input pad in this state, an electrostatic field between each of the X-electrodes and the corresponding Y electrode changes. A voltage that has changed due to this change in the electrostatic field is output from each Y-electrode. The changed voltage output from each Y-electrode is supplied to the control unit through an A/D (Analog-to-Digital) converter or the like. A voltage detector that is provided in the control unit can detect a position pressed with a finger or the like by specifying a position at which the electrostatic field between the X-electrode and the Y-electrode changes on the basis of the data supplied from the A/D converter.

In an operation panel provided in personal computers or the like, an input pad is arranged on the proximal side with respect to a keyboard input unit. An operator operates input keys of the keyboard input unit using each finger with both of their palms resting on both sides of the input pad. Additionally, when the operator operates the input pad, the operator moves the palm of their dominant hand from the operation panel, and touches the input pad with a finger of the dominant hand. Through this operation, the operator moves a pointer displayed on a screen, selects each menu screen displayed on a screen, and performs a tapping operation.

However, the input operations performed using the input pad are limited to operations, such as movement of a pointer on a display screen and selection of a menu screen. Additionally, switching input operations through tapping are also limited to preset input modes. To perform input operations other than the preset ones using the input pad, it is necessary to activate driver software installed in a personal computer, to display a management screen, and to change settings. Accordingly, performing various input operations using the input pad is limited unless settings are changed on the management screen.

SUMMARY

The present disclosure provides an input device for allowing various input operations to be performed using an input pad by detecting a position of hands without frequently changing settings.

According to an aspect of the present disclosure, an input device includes a keyboard input unit having a plurality of input keys and an input pad, provided on a proximal side with respect to the keyboard input unit. The input pad detects the touch of a hand through a change in capacitance. A palm detecting unit is provided outside of the input pad for detecting the hand that is in a position of operating the keyboard input device. A data processing unit generates different input signals on the basis of a detection output of the input pad according to whether the palm detecting unit detects the hand or not.

The input device according to the aspect of the present disclosure generates an input signal related to an operation performed on the keyboard input unit on the basis of the detection signal supplied from the input pad, when a user operates the keyboard input unit with their hands. On the other hand, when the hands are not in the position of operating the keyboard input unit, the input device generates a pad input signal based on a coordinate detection signal using the input pad. Such a configuration allows various input operations to be performed on the input pad without changing the setting regarding operation modes using pad driver software.

For example, according to the aspect of the present disclosure, when the palm detecting unit detects the hand, the data processing unit may determine whether or not the position on the input pad touched with the hand corresponds to a first operation area. The data processing unit may generate a space key input signal upon determining that the first operation area is touched with the hand. On the other hand, when the palm detecting unit does not detect the hand, the data processing unit may generate a pad input signal including coordinate information on the basis of a detection signal generated when the input pad is operated with the hand.

In the above-described configuration, a part of the input pad can be used as a space key input area when the hand is in the position of operating the keyboard input unit. The input pad can be arranged near each of the input keys of the keyboard input unit. Accordingly, a space of an operation panel can be efficiently used and the operation panel can be miniaturized.

The present invention allows various input operations to be performed using an identical input pad without frequently performing setting of a mode of an input pad using pad driver software. In particular, while an operator is using the keyboard input unit, an input signal related to an operation on the keyboard input unit is generated on the basis of a detection signal of the input pad, thereby permitting various input operations not limited to input keys of the keyboard input unit to be performed while the operator is using the keyboard input unit.

BRIEF DESCRIPTION OF THE DRAWINGS

FIG. 4 is a cross-sectional view showing a modification of an input device according to an embodiment of the present disclosure;

FIG. 5 is a cross-sectional view showing a modification of an input device according to an embodiment of the present disclosure;

FIG. 7 is a flowchart showing a control operation performed by input devices according to first and second embodiments of the present disclosure;

FIG. 10 is a flowchart showing a control operation performed by an input device according to a third embodiment of the present disclosure.

DESCRIPTION OF EMBODIMENTS

Figure 1:
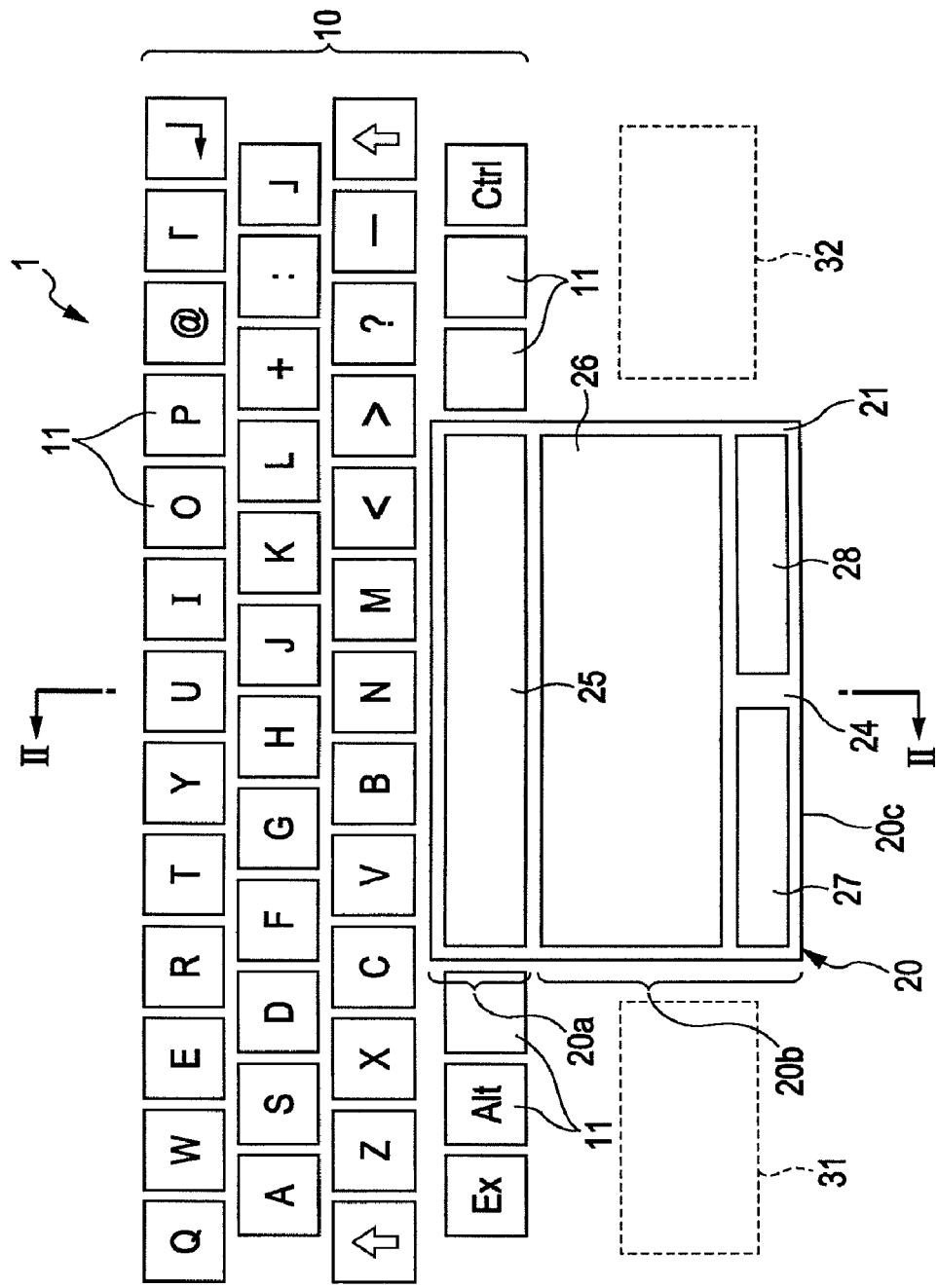
FIG. 1 is a plan view showing an input device according to a first embodiment of the present disclosure.
Figure 2:
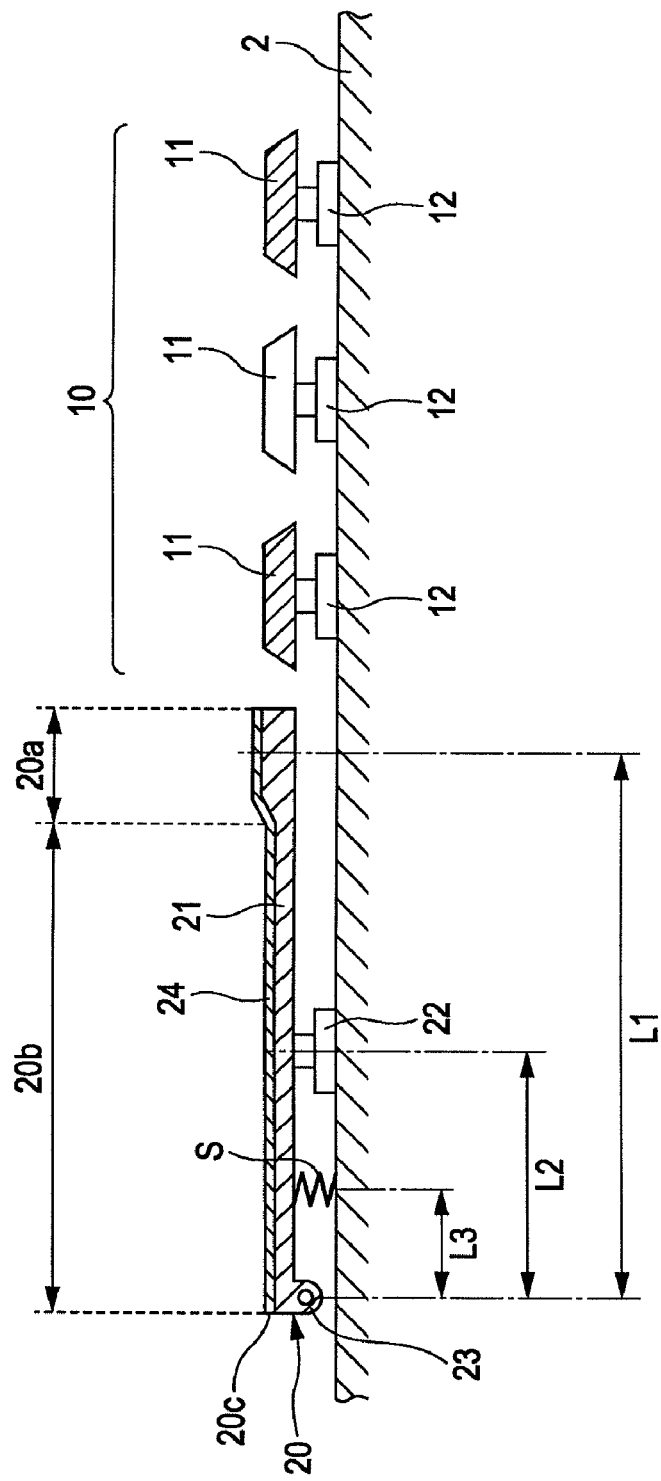
FIG. 2 is a cross-sectional view of an input device taken from line II-II of FIG. 1.

FIG. 1 is a plan view showing an input device according to a first embodiment of the present disclosure. FIG. 2 is a cross-sectional view taken from line II-II of FIG. 1.

An input device 1 is provided on an operation panel of a personal computer. The input device 1 is particularly suitable for being provided on an operation panel of a small notebook personal computer. In addition, the input device 1 can be used as a controller of electronic devices other than the personal computer, such as a game machine and a television. However, in embodiments given below, the description is given on the assumption that the input device 1 is provided on an operation panel of a personal computer.

As shown in FIG. 1, the input device 1 includes a keyboard input unit 10. The keyboard input unit 10 has a plurality of input keys 11 arranged regularly. As shown in FIG. 2, a plurality of key switches 12 are arranged on a substrate 2 of the input device 1. Each of the plurality of key switches 12 is provided for the corresponding input key 11. Pressing of one of the input keys 11 causes the output of the key switch 12 corresponding to the pressed input key 11 to be switched from "OFF" to "ON". As shown in FIG. 1, the input keys 11 of the keyboard input unit 10 correspond to "alphabet keys", "shift keys", an "enter key", and "control keys".

The input device 1 also includes an integrated input unit 20. The integrated input unit 20 is larger than each input key 11 used for inputting an "alphabet" or the like. As shown in FIG. 2, the integrated input unit 20 is provided with a rectangular large-sized key 21. The large-sized key 21 is rotatably supported by a supporting axis 23 fixed on the substrate 2. Instead of using the supporting axis 23, a part of the large-sized key 21 may be thinned, and this thin part may serve as a hinge to rotatably support the large-sized key 21. Additionally, the supporting axis 23 (or the hinge) is arranged on a distal side with respect to each of the input keys 11 constituting the keyboard input device 10. A side of the large-sized key 21 proximal to the input keys 11 is a free end.

A mechanical detection switch 22 for switching an output thereof from "OFF" to "ON" in response to pressing of the large-sized key 21 is provided on the substrate 2. A reinforcing spring S, i.e., a compression coil spring, is provided between the detection switch 22 and the supporting axis 23 (or the hinge). The resistance at the time of pressing of the large-sized key 21 is provided by the compression resistance of the reinforcing spring S and the detection switch 22.

An area on a surface of the large-sized key 21 proximal to the input keys 11 of the keyboard input device 10 corresponds to a first operation area 20a. An area that excludes the first operation area 20a and that extends to a trailing edge 20c on the side at which the supporting axis 23 (or the hinge) is provided corresponds to a second operation area 20b. The width of the first operation area 20a in the vertical direction of FIG. 1 is substantially equal to the width of the input key 11 in the same direction. That is, the first operation area 20a, i.e., a part of the large-sized key 21, is located within an array of the input keys 11 of the keyboard input device 10 arranged on the proximal side.

As shown in FIG. 2, regarding a shape of the cross section of the large-sized key 21, the first operation area 20a is elevated in the direction away from the substrate 2. The second operation area 20b is located at a position slightly lower than the first operation area 20a, and a surface of the second operation area 20b is a flat surface parallel to a surface of the substrate 2.

A capacitive input pad 24 is provided over the first operation area 20a and the second operation area 20b on the surface of the large-sized key 21. The input pad 24 is made of a resin film. The resin film is adhesively fixed to the surface of the large-sized key 21 by adhesive.

A plurality of X-electrodes is provided in parallel to each other on one surface of the insulating resin film, having a predetermined conductivity, of the input pad 24. Pluralities of Y-electrodes, which are orthogonal to the X-electrodes, are provided in parallel to each other on the other surface thereof. A detection electrode is provided between adjacent X-electrodes or between adjacent Y-electrodes. The detection electrodes are provided in parallel to each other at even intervals between adjacent X-electrodes or between adjacent Y-electrodes. In addition, a covering, such as a resin film, is provided on the top surface of the input pad 24.

Figure 6:
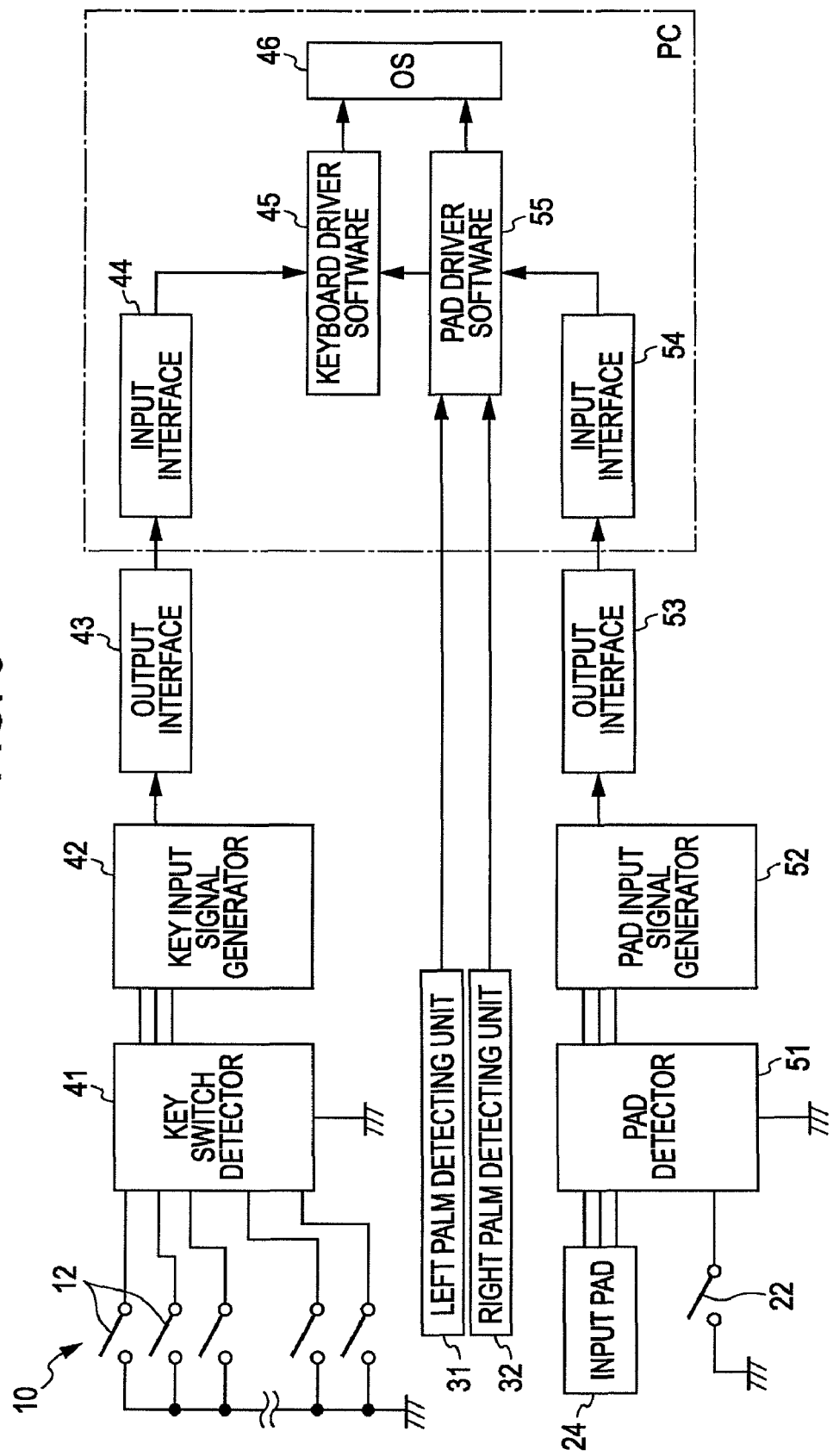
FIG. 6 is a block diagram showing a circuit configuration of an input device.

A driving circuit providing in a pad detector 51 shown in FIG. 6 sequentially selects an X-electrode. A potential is applied to the selected X-electrode, whereas the potential of unselected X-electrodes are set to a ground potential. A Y-electrode is sequentially selected at timing different from that of the selection of an X-electrode. A potential is applied to the selected Y-electrode, whereas the potential of unselected Y-electrodes are set to a ground potential.

In response to application of a potential to the selected X-electrode, a potential difference between the selected X-electrode and the detection electrode adjacent to this X-electrode gradually increases at a predetermined time constant due to the capacitance between the selected X-electrode and the detection electrode. At this time, if a finger, which is a conductive operation body, approaches the potential-applied X-electrode, for example, by touching a covering with the finger, capacitance is formed between the finger and the X-electrode. Due to this, the capacitance between the selected X-electrode and the detection electrode reduces, which thus slows down an increase in the potential difference between the X-electrode and the detection electrode. A position on an X coordinate touched with the finger can be analyzed on the basis of information regarding the selected X-electrode and a detection value at which the delay of the rise of the potential difference is detected. Similarly, a position on a Y coordinate touched with the finger can be detected on the basis of information regarding the selected Y-electrode and a detection value at which the delay in a rise of a potential difference between the Y-electrode and the detection electrode is detected.

As shown in FIG. 1, a covering that covers a surface of the input pad 24 of the large-sized key 21 has a printing. A space key input area 25, namely, a specific operation area, is printed or colored in the first operation area 20a so that the space key input area 25 can be distinguished from the other area. A substantially rectangular pad input portion 26 is separated or colored in the second operation area 20b. An L-key input portion 27 and an R-key input portion 28, which are separated or colored, are provided on the left and right on a side proximal to users with respect to the pad input portion 26, respectively. In this embodiment, the L-key input portion 27 and the R-key input portion 28 correspond to specification areas.

The operation panel, excluding areas of the keyboard input unit 10 and the integrated input unit 20, is covered with a synthetic resin covering. Under this covering, a left palm detecting unit 31 and a right palm detecting unit 32 are provided on the left and right sides of the integrated input unit 20, respectively. The left palm detecting unit 31 and the right palm detecting unit 32 are capacitive detection pads as in the case of the input pad 24. When a user places their left hand on the left palm detecting unit 31, the left palm detecting unit 31 can detect that the left hand is placed on the covering. Similarly, when a user places a right hand on the covering of the right palm detecting unit 32, the right palm detecting unit 32 can detect the hand. Additionally, the left palm detecting unit 31 and the right palm detecting unit 32 may be constituted by planar pressure sensitive switches.

Figure 3:
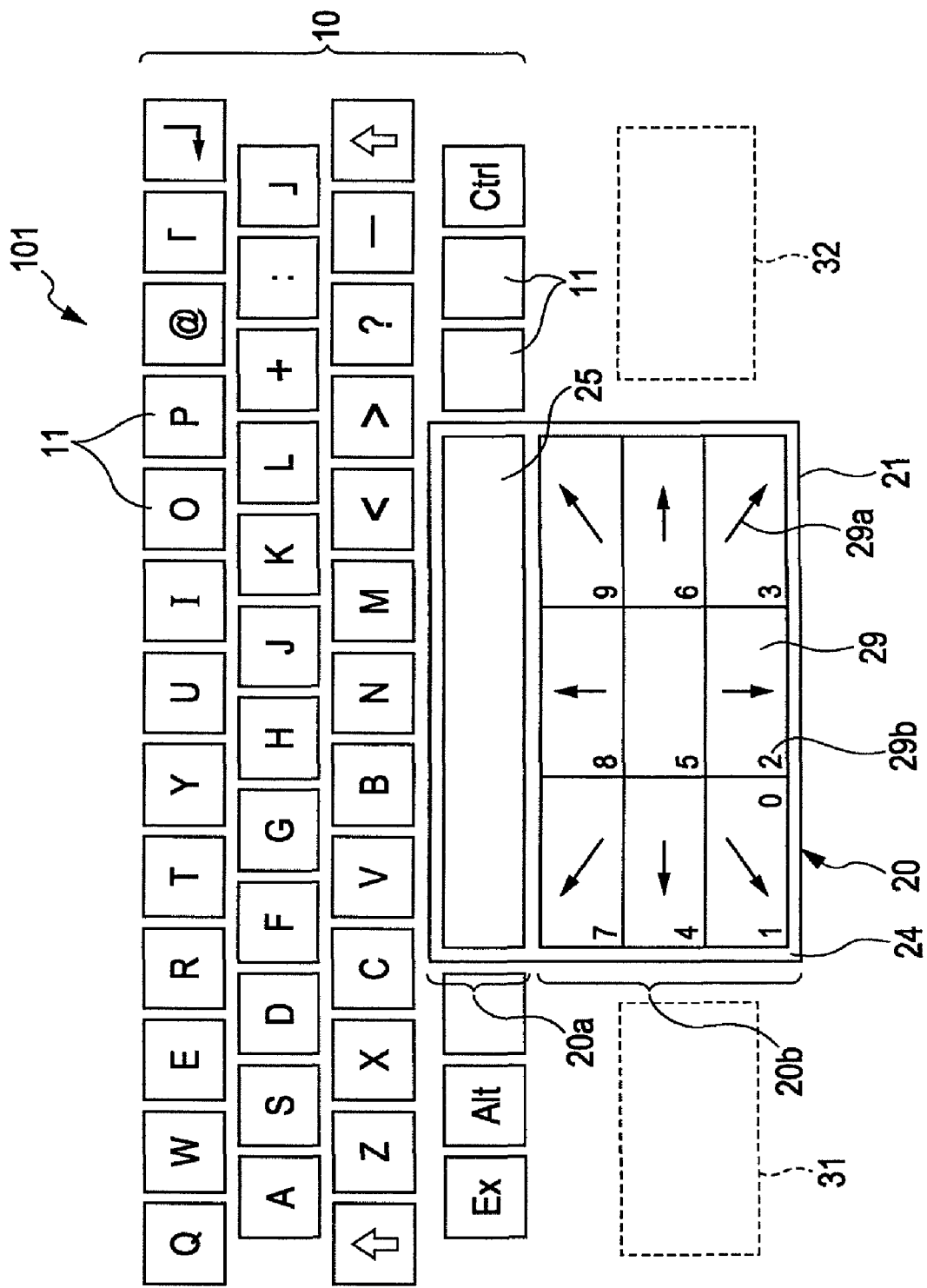
FIG. 3 is a plan view showing an input device according to a second embodiment of the present disclosure.

FIG. 3 is a plan view showing an input device 101 according to a second embodiment of the present disclosure.

The input device 101 has a configuration similar to that of the input device 1 according to the first embodiment. Accordingly, the same or similar parts as those of the input device 1 according to the first embodiment are denoted by like reference characters, and detailed description thereof is omitted.

As shown in FIG. 3, a capacitive input pad 24 is provided on a surface of a large-sized key 21 in an integrated input unit 20 of the input device 101. The printing provided on the surface of the input pad 24 differs from that of the input device 1 according to the first embodiment. In this input device 101, a space key input area 25 is formed with a printing or the like in a first operation area 20a of the integrated input unit 20. In a second operation area 20b, nine sections 29 are formed with a printing or are colored. An arrow indicator 29a and a numeral indicator 29b are printed in each section 29. According to this embodiment, each of the sections 29 corresponds to a specification area.

FIGS. 4 and 5 are cross-sectional views showing modifications of the input device 1 according to the first embodiment or the input device 101 according to the second embodiment.

In the modification shown in FIG. 4, the first operation area 20a provided on the surface of the large-sized key 21 is a planar plane parallel to a surface of the substrate 2. The second operation area 20b is a sloping plane that gradually approaches the surface of the substrate 2 from the boundary of the first operation area 20a to the trailing edge 20c.

In the modification shown in FIG. 5, a slot 20d is formed at a boundary of the first operation area 20a and the second operation area 20b on the surface of the large-sized key 21 so that users can distinguish the first operation area 20a and the second operation area 20b by touch of a finger. In addition, the first operation area 20a and the second operation area 20b are planar planes parallel to the surface of the substrate 2.

The capacitive input pad 24 is provided on both of the first operation area 20a and the second operation area 20b in the modifications shown in FIGS. 4 and 5. Since the slot 20d is formed on a part of the surface of the large-sized key 21 in the modification shown in FIG. 5, the input pad 24 is notched at the slot 20d.

As shown in FIG. 2, in each of the embodiments and modifications, a distance from a rotation fulcrum formed by the supporting axis 23 (or the hinge) to a center of the first operation area 20a, a distance from the supporting axis 23 to an operation point of the detection switch 22, and a distance from the supporting axis 23 to an action point of the reinforcing spring S are denoted by L1, L2, and L3, respectively. The distances L1, L2, and L3 are in the relation of "L3<L2<L1". Additionally, L2 and L3 are not longer than a half of L1.

Accordingly, the large-sized key 21 rotates by pressing the first operation area 20a with a finger with a relatively small force, thereby allowing users to easily switch the output of the detection switch 22 from "OFF" to "ON". Accordingly, while users are operating the input keys 11 of the keyboard input unit 10 with both of their palms on the operation panel, the users can easily switch the output of the detection switch 22 into "ON" by pressing the first operation area 20a, for example, with a thumb.

On the other hand, since the second operation area 20b is provided with the detection switch 22 and the reinforcing spring S, the output of the detection switch 22 is not switched unless users press the large-sized key 21 with a fairly large force when the users touches the second operation area 20b with a finger. Accordingly, the output of the detection switch 22 is hardly switched by an operation of sliding a finger on the second operation area 20b in order to operate the input pad 24. However, when users press the L-key input portion 27 or the R-key input portion 28 firmly with a finger after moving their palms from the operation panel, the users can switch the detection switch 22 to "ON".

FIG. 6 is a block diagram showing a circuit configuration of the input device 1 according to the first embodiment, the input device 101 according to the second embodiment, and the input device according to each of the modifications.

Referring to FIG. 6, an area enclosed by a chain line shows a circuit configuration of a mainframe PC of a personal computer.

An ON-OFF switched output of each key switch 12 of the keyboard input unit 10 is supplied to a key switch detector 41 provided in the keyboard input unit 10. The key switch detector 41 includes a power supply circuit for supplying a current to each key switch 12, and a detection circuit for detecting the key switch 12 that is turned "ON". The detection signal obtained by the key switch detector 41 is supplied to a key input signal generator 42.

The key input signal generator 42 converts the key input signal, namely, one of switching signals of the key switches 12 that are operated in succession, into a predetermined format. The converted key input signal is supplied to an input interface 44 included in the mainframe PC of the personal computer through an output interface 43. Keyboard driver software 45 is installed in the mainframe PC of the personal computer. The key input signal is processed by this keyboard driver software 45.

The keyboard driver software 45 converts the key input signal into a keyboard input signal compliant with the specification of an operating system (OS) 46 through the processing operation thereof, and supplies the keyboard input signal to the OS 46.

A detection output of the input pad 24 and a switching output of the detection switch 22 are supplied to a pad detector 51 connected to the input pad 24. The pad detector 51 includes a driving circuit. This driving circuit includes an X-driver for selecting an X-electrode provided on the input pad 24 and applying a potential to the selected X-electrode, and a Y-driver for selecting a Y-electrode and applying a potential to the selected Y-electrode. Furthermore, the pad detector 51 includes a detection circuit for detecting a change in a potential between the potential-applied electrode and the corresponding detection electrode. The pad detector 51 further includes another detection circuit for detecting the detection output of the detection switch 22.

The detection output from the pad detector 51 is supplied to a pad input signal generator 52 coupled to the input pad 24. The pad input signal generator 52 recognizes a position on the input pad 24 operated with a finger as absolute coordinate data representing the position on X-Y coordinates. The pad input signal generator 52 supplies a signal of a predetermined bit length including this absolute coordinate data and the detection output of the detection switch 22 to an input interface 54 included in the mainframe PC of the personal computer through an output interface 53.

Pad driver software 55 is installed in the mainframe PC of the personal computer. The input signal supplied to the input interface 54 is processed by the pad driver software 55. The pad driver software 55 converts the absolute coordinate data on the X-Y coordinates and the detection output of the detection switch 22 supplied from the pad input signal generator 52 into coordinate data compliant with the specification of the OS 46 through the processing operation thereof, and supplies the converted coordinate data to the OS 46. For example, the pad driver software 55 converts the absolute coordinate data supplied from the pad input signal generator 52 into relative coordinate data constituted by a signal indicating that the input pad 24 is touched with a finger and a signal indicating a direction and a distance of movement of the finger on the X-Y coordinates, and supplies the relative coordinate data to the OS 46. In addition, when the output of the detection switch 22 is switched under a predetermined condition, the pad driver software 55 informs the keyboard driver software 45 of information regarding an operation of a specific key.

Additionally, detection signals of the left palm detecting unit 31 and the right palm detecting unit 32 are supplied to a processing unit of the pad driver software 55 installed in the mainframe PC of the personal computer. Since the left palm detection unit 31 and the right palm detection unit 32 are capacitive detection pads as in the case of the input pad 24, circuits equivalent to the pad detector 51 and the pad input signal generator 52 are connected to the left palm detecting unit 31 and the right palm detecting unit 32. Output interfaces and input interfaces for supplying each signal to the pad driver software 55 are also provided. However, illustration of these circuits is omitted in FIG. 6.

In each of the above-described embodiments, a processing operation performed by the pad driver software 55 mainly corresponds to a data processing unit.

Control operations performed using the input device 1 according to the first embodiment, the input device 101 according to the second embodiment, or the input device according to each modification will be described next with reference to a flowchart shown in FIG. 7. In each flowchart described below, "STEP" is abbreviated to "ST".

In initial setup of this input device, the keyboard driver software 45 or the pad driver software 55 is activated and various kinds of environment setup are performed on management screens related to each driver software displayed on a display screen. This environment setup includes a setting of a palm detection mode.

During the setting of the palm detection mode, an operator places their left hand on the left palm detecting unit 31 in a position of operating the keyboard input unit 10. The detection output of the capacitive left palm detecting unit 31 at that time, namely, information regarding the shape of the left palm detected by the left palm detecting unit 31, is supplied to a processing unit of the activated keyboard driver software 45 or a processing unit of the activated pad driver software 55 so as to be stored. In addition, the operator similarly places their right hand on the right palm detecting unit 32 in a position of operating the keyboard input unit 10. The detection output at that time is stored similarly.

After this environment setup, the left palm detecting unit 31 compares the detection information with the stored information upon detecting a hand. If the detection information matches the stored information within a predetermined probability, the left palm detection unit 31 determines that the left hand is placed thereon in the position of operating the keyboard input unit 10. The same applied to the right hand.

The palm detection information stored during this environment setup may be a data regarding an area on the X-Y coordinates representing substantially a whole area of a contact pattern on a surface of the operation panel touched with the palm. Alternatively, the stored detection data may be sample information regarding a detection signal obtained from the left palm detecting unit 31 or the right palm detecting unit 32 sampled as some signals on the X-Y coordinates.

FIG. 7 is a flowchart of a first control operation performed using the input device 1 shown in FIGS. 1 and 2. In FIG. 7, "STEP" is abbreviated to "ST". The control operation shown in FIG. 7 is performed on the basis of polling of the pad detector 51 provided for the input pad 24 and the pad detectors provided for the left palm detecting unit 31 and the right palm detecting unit 32 performed by the pad driver software 55 and responses from these pad detectors. The operation flow shown in FIG. 7 corresponds to one polling operation, and this operation flow is repeated.

A touch of a finger on the input pad 24 triggers the control operation shown in FIG. 7 to be started.

Upon being supplied with a coordinate detection signal from the input pad 24 in response to the touch of a finger on the input pad 24 at ST1, the pad driver software 55, which is part of the data processing unit, sets palm detection flags for the left palm detection unit 31 and the right palm detecting unit 32 to store the palm detection results of the left palm detecting unit 31 and the right palm detecting unit 32 in the palm detection flags, respectively, at ST2.

At ST3, the pad driver software 55 determines whether or not the detection switch 22 is turned "ON". If the pad driver software 55 determines that the detection switch 22 is turned "ON" at ST3, the following processing is performed If the processing unit of the pad driver software 55 detects that the detection switch 22 is turned "ON" at ST3, the pad driver software 55 determines whether or not a space key down flag is "ON", i.e., whether or not a space key input signal was output to the OS 46 during the previous polling, at ST4. If the pad driver software 55 determines that the space key down flag is not ON at ST4, the process proceeds to ST5. At ST5, the pad driver software 55 determines whether or not a mouse button down flag is "ON", i.e., whether or not a key input signal (more specifically, a left click signal) indicating that the L-key input portion 27 that equivalently functions as a mouse button is operated or a key input signal (more specifically, a right click signal) indicating that the R-key input portion 28 is operated was output during the previous polling.

If the pad driver software 55 determines that the mouse button down flag is not "ON" at ST5, the process proceeds to ST6. The pad driver software 55 determines whether or not a coordinate position currently detected by the input pad 24 corresponds to the first operation area 20a shown in FIG. 1 at ST6. If the pad driver software 55 determines that the area touched with a finger corresponds to the first operation area 20a, namely, the space key input area 25, at ST6, the process proceeds to ST7. The pad driver software 55 determines whether or not both of the detection flags for the left palm detecting unit 31 and the right palm detecting unit 32 are ON at ST7. If the pad driver software 55 determines that both of the detection flags are ON, i.e., both of right and left hands are in the position of operating the keyboard input unit, the process proceeds to ST8. The pad driver software 55 sets the space key down flag to "ON" at ST8. The processing unit of the pad driver software 55 notifies the processing unit of the keyboard driver software 45 of the key input signal at ST9. The OS 46 is further notified with the key input signal at ST10. If the space key down flag is set to "ON", the process proceeds from ST4 to ST17 during the following polling. The pad driver software 55 ignores coordinate detection data generated in response to an operation performed on the input pad 24 with a finger, and enables only the space key input signal.

If the detection switch 22 is turned "ON" and neither the space key down flag nor the mouse button down flag is "ON" and the pad driver software 55 determines that the area on the input pad 24 touched with the finger does not correspond to the first operation area 20*a* at ST6, the process proceeds to ST11. At ST11, the pad driver software 55 determines whether or not the area touched with the finger corresponds to a specification area, i.e., the L-key input portion 27 or the R-key input portion 28. If the pad driver software 55 determines that the specification area is touched with the finger, the process proceeds to ST12. At ST12, the pad driver software 55 sets the mouse button down flag to "ON", and advances the process to ST13. The processing unit of the pad driver software 55 analyzes the coordinates of the area on the input pad 24 touched with the finger. If the pad driver software 55 determines that the L-key input portion 27 is touched with the finger, the process proceeds to ST14. At ST14, the pad driver software 55 notifies the OS 46 of a left click signal. If the pad driver software 55 determines that R-key input portion 28 is touched with the finger at ST13, the pad driver software 55 notifies the OS 46 of the right click signal at ST14.

If the pad driver software 55 determines that the area on the input pad 24 touched with the finger does not correspond to the first operation area 20*a* at ST6 and that the area touched with the finger does not correspond to the specification area (more specifically, the L-key input portion 27 or the R-key input portion 28), i.e., that the area touched with the finger corresponds to the pad input portion 26, at ST11, the process proceeds to ST15. At ST15, the pad driver software 55 maintains the operation state of the mouse buttons (i.e., the L-key input portion 27 and the R-key input portion 28). That is, the pad driver software 55 determines that the mouse buttons are not operated at this time, and advances the process to ST13. The pad driver software 55 detects the coordinate position of the pad input portion 26 touched with the finger at ST13, and notifies the OS 46 of the position at ST14. In this case, the pad driver software 55 supplies a normal pad input signal to the OS 46, thereby allowing a pointer displayed on a screen to be moved with a finger operation.

If it is determined that the area on the input pad 24 touched with the finger corresponds to the first operation area 20*a* at ST6 and both of the left palm detecting unit 31 and the right palm detecting unit 32 do not detect the hand at ST7, i.e., that both hands are not placed on the operation panel or only one hand is placed on the operation panel, the process proceeds to ST15. In this case, the pad driver software 55 advances the process to ST13 without updating the operation state of the mouse buttons. The coordinates of the position touched with the finger are detected at ST13. The pad input signal is supplied to the OS 46 at ST14.

Additionally, if the pad driver software 55 determines that the mouse button down flag is "ON" when the detection switch 22 is "ON" at ST5, the process proceeds to ST16. Since the mouse button input signal has been already supplied to the OS 46 during the previous polling, the operation state of the mouse buttons is maintained. The pad driver software 55 determines whether the L-key input portion 27 or the R-key input portion 28 is touched at ST13. The pad driver software 55 notifies the OS 46 of the left click signal or the right click signal.

If the detection switch 22 is determined to be "OFF" at ST3, the following control processing is executed.

The pad driver software 55 determines whether the space key down flag is currently "ON" at ST18. If the space key down flag is "ON", i.e., the space key input signal is supplied to the OS 46 during the previous polling, the process proceeds to ST19. The processing unit of the pad driver software 55 determines that the input of the space key is released, and sets the space key down flag to "OFF". The processing unit of the keyboard driver software 45 is notified of this by the processing unit of the pad driver software 55 at ST20, and, in turn, notifies the OS 46 of this at ST21, and then advances the process to ST22.

If the space key down flag is determined to be "OFF" at ST18, i.e., if the space key input signal is not supplied to the OS 46, the process proceeds to ST22. The pad driver software 55 determines whether or not the mouse button down flag is "ON" at ST22. If the mouse button down flag is "ON", i.e., the left click signal or the right click signal is supplied to the OS 46 during the previous polling, the process proceeds to ST23. The processing unit of the pad driver software 55 determines that the input of the mouse button performed on the L-key input portion 27 or the R-key input portion 28 is released, and sets the mouse button down flag to "OFF". The process then proceeds to ST24. At ST24, the processing unit of the pad driver software 55 analyzes the position on the input pad 24 operated with the finger on the basis of the detected coordinate data. The processing unit of the pad driver software 55 generates a pad input signal, and notifies the OS 46 of the pad input signal at ST25.

If the pad driver software 55 determines that the mouse button down flag is "OFF" at ST22, the pad driver software 55 determines whether or not the area on the input pad 24 touched with the finger corresponds to the first operation area 20*a* at ST26. If the area touched with the finger does not correspond to the first operation area 20*a*, the process proceeds to ST27. The pad driver software 55 advances the process to ST24 without updating the current operation state of the mouse buttons. The pad driver software 55 detects the coordinates of the position touched with the finger and generates a pad input signal at ST24, and notifies the OS 46 of the pad input signal at ST25. Additionally, the pad driver software 55 determines that the area touched with the finger does not correspond to the first operation area 20*a* but corresponds to the second operation area 20*b* at ST26, the process proceeds to ST28. At ST28, if the pad driver software 55 determines that both of the left palm detecting unit 31 and the right palm detecting unit 32 do not detect the hands, i.e., both hands are moved from the operation panel or only one hand touches the operation panel, the process proceeds to ST27. The process then further proceeds to ST24 and ST25, and the pad input signal is supplied to the OS 46.

If both of the left palm detecting unit 31 and the right palm detecting unit 32 detect hands at ST28, the process proceeds to ST29. At ST29, the pad driver software 55 ignores the coordinate detection signal supplied from the input pad 24.

In the control operation, processing for inserting a space in a character string displayed on a screen of a display unit of the personal computer is performed upon the OS 46 being supplied with the space input signal. Additionally, processing for moving a pointer displayed on a screen is performed upon the OS 46 being supplied with the pad input signal. Processing for opening a menu screen or processing for activating a program is performed on the basis of signal processing preset in the pad driver software 55 and the OS 46 upon the OS 46 being supplied with the right click signal or the left click signal.

In the control operation shown in FIG. 7, both of the left palm detecting unit 31 and the right palm detecting unit 32 detect that hands are in positions of operating the keyboard input unit 10. If the detection switch 22 is turned ON at this time and the area touched with a finger corresponds to the first operation area 20*a*, the OS 46 is supplied with a space key input signal. On the other hand, if the detection switch 22 is turned ON and the area touched with the finger corresponds to the L-key input portion 27 or the R-key input portion 28, the pad driver software 55 outputs a left click signal or a right click signal regardless of whether or not the left palm detecting unit 31 and the right palm detecting unit 32 detect hands. If both hands are moved from the operation panel or only one hand is placed on the operation panel with the detection switch 22 being turned ON, coordinate data can be input (a pad input signal can be supplied) using both of the first operation area 20*a* and the pad input portion 26. Additionally, if the pad driver software 55 determines that the area touched with a hand corresponds to neither the first operation area 20*a* nor the L-key input portion 27 and the R-key input portion 28, but corresponds to the pad input portion 26 when the detection switch 22 is turned ON, the pad driver software 55 may ignore the detection output of the detection switch 22 and the coordinate detection data from the input pad 24.

In addition, if both of the left palm detecting unit 31 and the right palm detecting unit 32 detect that hands are in the position of operating the keyboard input device 10 when the detection switch 22 is turned OFF, the input coordinate data from the input pad 24 is ignored. On the other hand, if both hands are moved from the operation panel or only one hand is placed on the operation panel, a whole surface of the input pad 24 can be used for input of coordinate data, namely, generation of a pad input signal.

A first control operation performed using the input device 101 according to the second embodiment shown in FIG. 3 will be described next. That is, the control operation performed using the detection output from the left palm detecting unit 31 and the right palm detecting unit 32 will be described.

The input device 101 has two kinds of operation modes for operating the sections 29, namely, the specification areas. A first setting mode is for input operations according to the arrow indicators 29*a* shown in the sections 29. These input operations are equivalent to operations of keyboard arrow keys provided in an ordinary keyboard input unit that indicates up and down and left and right directions. A second setting mode is for input operations according to nine numeral indicators 29*b* separately shown in the sections 29. In this case, the input operations are recognized as input operations performed on a numeral keypad.

The setting mode, among the two kinds, used for processing input information of the sections 29 is decided by setting the input mode on a displayed management screen after activating the pad driver software 55 and displaying the management screen on a display.

The control operation performed using the input device 101 according to the second embodiment shown in FIG. 3 corresponds to the control operation shown in FIG. 7 in which the mouse buttons (i.e., the L-key input portion 27 and the R-key input portion 28) are replaced by the sections 29. More specifically, the control operation performed using the input device 101 corresponds to the control operation in which the mouse button down flag shown in FIG. 7 is replaced by an operation flag of the sections 29.

If the pad driver software 55 determines that the area on the input pad 24 touched with the finger corresponds to the first operation area 20*a* at ST6 of FIG. 7 and that both of the left palm detecting unit 31 and the right palm detecting unit 32 detect palms at ST7, the process proceeds to ST8. At ST8, the pad driver software 55 sets the space key down flag to ON.

If the pad driver software 55 determines that the area touched with the finger does not correspond to the first operation area 20*a* at ST6 and that the area touched with the finger is in the sections 29 at ST11, the pad driver software 55 sets the operation flag of the sections 29 to ON at ST12. The pad driver software 55 then detects the position of the finger in the sections 29 at ST13.

If the pad driver software 55 determines that the detection switch 22 is turned ON and detects that an area displaying the arrow indicator 29*a* in the section 29 is touched with the finger while the pad driver software 55 is operating in the first setting mode, the processing unit of the pad driver software 55 notifies the processing unit of the keyboard driver software 45 of a signal. The keyboard driver software 45, in turn, supplies the OS 46 with an input signal that is the same as that supplied when one of the keyboard arrow keys for up and down, right and left, and oblique directions is operated. An operation of an area displaying an upward arrow causes, for example, a character string displayed on a screen to be moved upward. An operation of an area displaying a downward arrow causes, for example, a character string displayed on a screen to be moved downward. Alternatively, upward sequential selection or downward sequential selection of a pull-down menu is performed. An operation of areas displaying left and right arrows causes, for example, a position of a selected character in a character string displayed on a screen sequentially moves to the left and right, respectively, or menus in a menu screen to be sequential selected from side to side. In addition, if the area displaying an arrow for an oblique direction is determined to be touched with a finger, a control operation, such as movement of an image displayed on a screen in the oblique direction, is performed.

If the pad driver software 55 determines that the detection switch 22 is turned ON and detects that a section 29 including the numeral indicator 29*b* is touched with a finger at ST13 while operating in the second setting mode, the pad driver software 55 notifies the keyboard driver software 45 of an input signal. The keyboard driver software 45, in turn, supplies the OS 46 with an input signal that is the same as that supplied when a numeral key is operated. This numeral key input causes a numeral to be displayed on a screen, or a calculation using the numeral to be performed.

The operations performed when the detection switch 22 is not turned ON are similar to the control operations shown in the flowchart of FIG. 7. More specifically, if the detection switch 22 is turned OFF and the left palm detecting unit 31 and the right palm detecting unit 32 do not detect hands or detect only one hand, a whole surface of the input pad 24 provided on the large-sized key 21 is used as a coordinate input area (i.e., pad input area) at ST24, and the OS 46 is notified with a pad input signal. The use of the whole surface of the input pad 24 as the pad input area allows users to easily perform a coordinate input operation even with a small integrated input unit 20.

Figure 8:
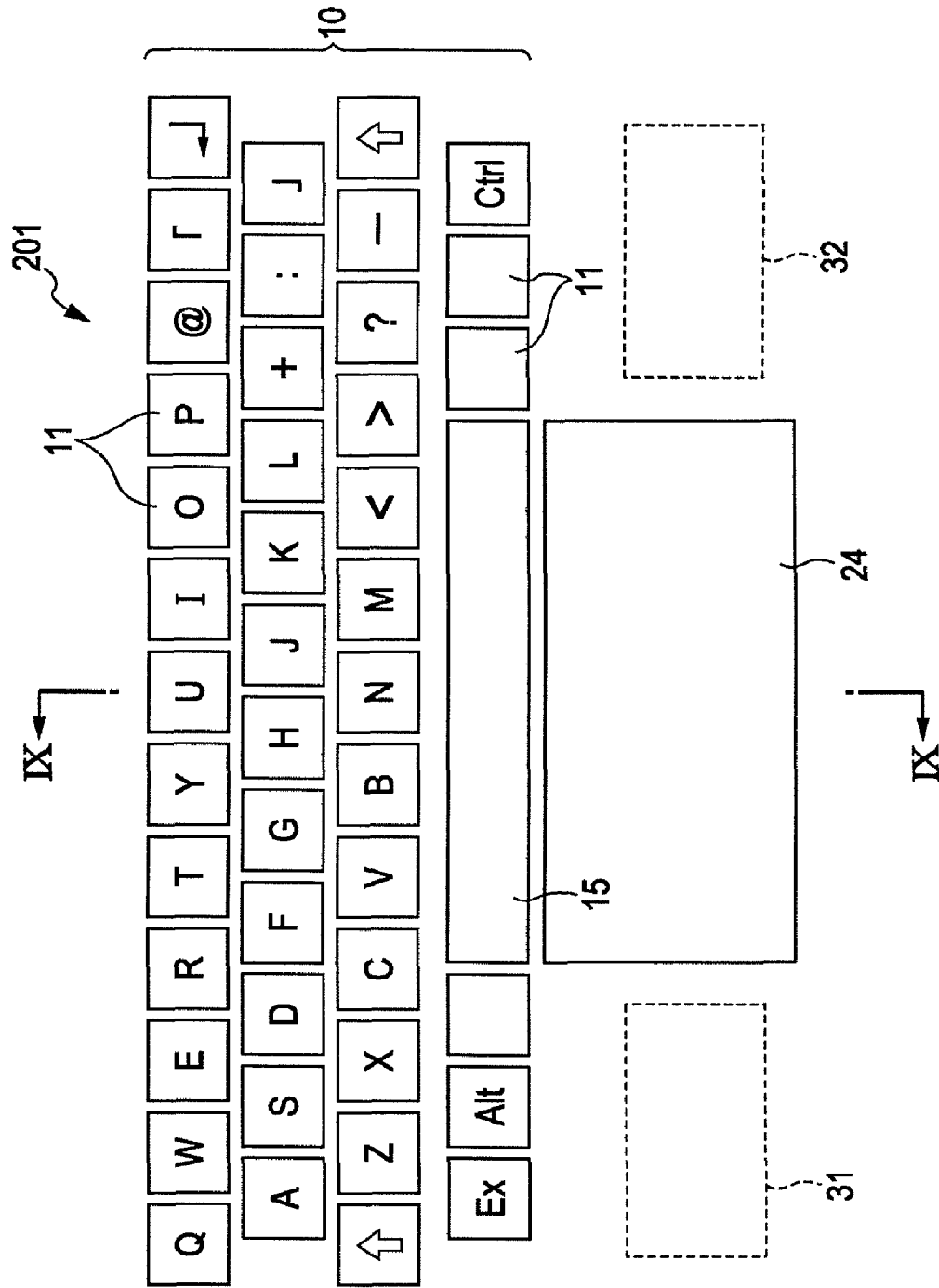
FIG. 8 is a plan view showing an input device according to a third embodiment of the present disclosure.
Figure 9:
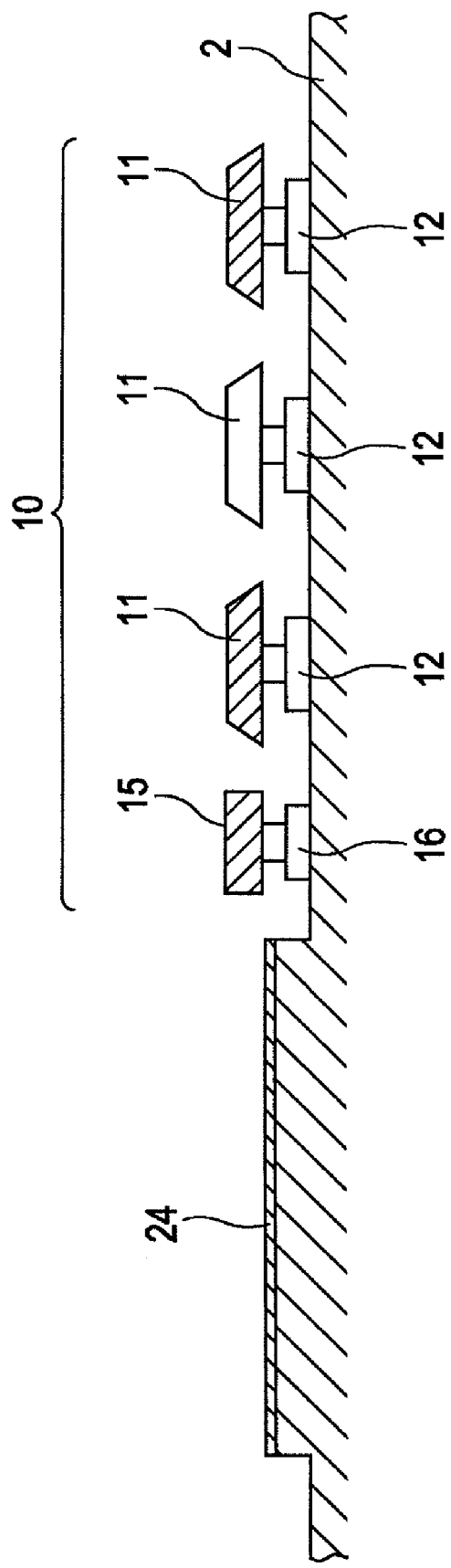
FIG. 9 is a cross-sectional view of an input device taken from line IX-IX of FIG. 8.

FIG. 8 is a plan view showing an input device 201 according to a third embodiment of the present invention. FIG. 9 is a cross-sectional view taken from line IX-IX of FIG. 8.

A keyboard input unit 10 of the input device 201 includes input keys 11 showing "alphabets" and an elongated space input key 15 provided in an array of the keys on the proximal side. As shown in FIG. 9, in the keyboard input unit 10, key switches 12 whose output is switched with the input keys 11 and a space key switch 16 whose output is switched with the space input key 15 are provided on a substrate 2. In this input device 201, the space input key 15 is included in the keyboard input unit 10. The space input key 15 is used only for a space key input as in the case of ordinary keyboard input units.

On the proximal side with respect to the keyboard input unit 10, a capacitive input pad 24 is provided. This input pad 24 is fixed on the substrate 2 or the like, and is not provided with the large-sized key 21 and the detection switch 22 shown in FIGS. 1 to 4.

In this input device 201, a covering that covers a surface of the input pad 24 has a printing or is colored. As in the case of the first embodiment shown in FIG. 1, a pad input portion 26 and an L-key input portion 27 and an R-key input portion 28, which are specification areas, are shown on the surface of the input pad 24. Alternatively, as in the case of the second embodiment shown in FIG. 3, sections 29, i.e., specification areas, as well as arrow indicators 29a and numeral indicators 29b are provided on the surface of the input pad 24.

In addition, as shown in FIG. 8, a left palm detecting unit 31 and a right palm detecting unit 32 are provided on both sides of the input pad 24.

The control circuit of the input device 201 shown in FIGS. 8 and 9 are substantially the same as those, shown in FIG. 6, of the input device 1 according to the first embodiment and of the input device 101 according to the second embodiment. A difference between these control circuits is that the detection switch 22 is not provided in the control circuit of the input device 201.

FIG. 10 is a flowchart showing a control operation performed by the input device 201.

In this control operation, upon being supplied with a coordinate detection signal from the input pad 24 at ST41, the pad driver software 55 stores the palm detection results supplied form the left palm detecting unit 31 and the right palm detecting unit 32 in palm detection flags at ST42.

The pad driver software 55 monitors detection outputs of the left palm detecting unit 31 and the right palm detecting unit 32 at ST43. If the pad driver software 55 determines that at least one of the left palm detecting unit 31 and the right palm detecting unit 32 detects a hand at ST43, the pad driver software 55 analyzes a position on the input pad 24 touched with a finger at ST44. If the pad driver software 55 determines that the area touched with the finger corresponds to the specification area at ST44, the pad driver software 55 generates an input signal corresponding to the specification area at ST45, and notifies the OS 46 of the input signal at ST46 (which corresponds to ST25).

If the specification area corresponds to the L-key input portion 27 and the R-key input portion 28 shown in FIG. 1 and the pad driver software 55 determines one of these input portions is touched with a finger, the OS 46 is supplied with an L-key input signal or an R-key input signal, which is a switching signal, as in the case of the first embodiment. If the specification area corresponds to the sections 29 shown in FIG. 3, the pad driver software 55 detects the section touched with the finger, and the OS 46 is supplied with a switching signal corresponding to the arrow indicator 29a or the numeral indicator 29b.

If neither the left palm detecting unit 31 nor the right palm detecting unit 32 detects a hand at ST43, the process proceeds to ST47. The whole surface of the input pad 24 is used as a coordinate detection area at ST47. The pad driver software 55 analyzes coordinates of the detected area to generate coordinate data at ST48, and supplies a pad input signal including the coordinate data to the OS 46 at ST49.

In addition, if both of the right palm detecting unit 31 and the left palm detecting unit 32 detect hands and recognize the hands are in the position of operating the keyboard input unit 10 at ST43, the process may proceed to ST44. If neither the right palm detecting unit 31 nor the left palm detecting unit 32 detects a hand, or if one of the right palm detecting unit 31 and the left palm detecting unit 32 detects a hand, the process may proceeds to ST47.

What is claimed is:

1. An input device comprising:
a keyboard input unit having a plurality of input keys;
an input pad that detects touch of a hand through a change in capacitance, the input pad including
a detecting switch that is provided on a proximal side with respect to the keyboard input unit and detects pressing operation when the input pad is pressed,
a palm detecting unit that is provided outside of the input pad and detects the hand that is in a position of operating the keyboard input device; and
a data processing unit that generates different input signals on the basis of a detection output of the input pad according to whether the palm detecting unit detects the hand or not,
wherein when both hands are detected at the palm detecting unit and it is judged that a preset area on the input pad is touched with the hand, and, in addition, when the pressing of the input pad is detected by the detection switch, the data processing unit generates an input signal that has been assigned to the area in advance; and
when both hands are not detected at the palm detecting unit and the touching of the area on the input pad with the hand is detected, the data processing unit generates a pad input signal that includes coordinate information that indicates a position on the input pad that is touched with the hand irrespective of the output of the detection switch.

2. The input device according to claim 1, wherein the preset area is a space key input section and the input signal that has been assigned in advance is a space input signal.

3. The input device according to claim 2, wherein the space key input section is located within an array of the input keys constituting the keyboard input unit.

4. The input device according to claim 1, wherein when both hands are not detected at the palm detecting unit, the whole detection area of the input pad is used as a coordinate detection area to generate the pad input signal including the coordinate information indicating the position on the input pad that is touched with the hand.

5. An input device comprising:
a keyboard input unit that has a plurality of input keys; and
an input pad that detects touch of a hand through a change in capacitance, the input pad including
a detection switch that is provided on a proximal side with respect to the keyboard input unit and detects pressing operation when the input pad is pressed,
a palm detecting unit that is provided outside of the input pad and detects the hand that is in a position of operating the keyboard input unit, and
a data processing unit that generates different input signals on the basis of a detection output of the input pad according to whether the palm detecting unit detects the hand or not, wherein when both hands are detected at the palm detecting unit or when both hands are not detected at the palm detecting unit, it is judged that a preset area on the input pad is touched with the hand, and, in addition, when the pressing of the input pad is detected by the detection switch, the data processing unit generates an input signal that has been assigned to the area in advance; and when both hands are not detected at the palm detecting unit, when the touching of the area on the input pad with the hand is detected, and, in addition, when the pressing of the input pad is not detected by the detection switch, the data processing unit generates a pad input signal that includes coordinate information that indicates a position on the input pad that is touched with the hand.

6. The input device according to claim 5, wherein the preset area is a plurality of direction input sections, and the input signal that has been assigned in advance is a direction instruction signal corresponding to each of the plurality of direction input sections.

7. The input device according to claim 5, wherein the preset area is a plurality of numeric key input sections, and the input signal that has been assigned in advance is a numeral instruction signal corresponding to each of the plurality of numeric key input sections.

8. The input device according to claim 5, wherein when both hands are not detected at the palm detecting unit, the whole detection area of the input pad is used as a coordinate detection area to generate the pad input signal including the coordinate information indicating the position on the input pad that is touched with the hand.

* * * * *